US006169936B1

(12) United States Patent
Lohmann

(10) Patent No.: US 6,169,936 B1
(45) Date of Patent: Jan. 2, 2001

(54) METHOD OF CONTROLLING THE INPUT STATION IN A LETTER-SORTING INSTALLATION

(75) Inventor: Boris Lohmann, Allensbach (DE)

(73) Assignee: Licentia Patent-Verwaltungs-GmbH, Frankfurt (DE)

( * ) Notice: Under 35 U.S.C. 154(b), the term of this patent shall be extended for 0 days.

(21) Appl. No.: 08/750,170

(22) PCT Filed: May 24, 1995

(86) PCT No.: PCT/EP95/01976

§ 371 Date: Apr. 14, 1997

§ 102(e) Date: Apr. 14, 1997

(87) PCT Pub. No.: WO95/33580

PCT Pub. Date: Dec. 14, 1995

(30) Foreign Application Priority Data

Jun. 3, 1994 (DE) .............................................. 44 19 430

(51) Int. Cl.[7] ....................................................... G06F 7/00
(52) U.S. Cl. .......................... 700/224; 700/223; 700/226
(58) Field of Search .................................. 700/223, 224, 700/225, 226, 228, 229; 198/571, 572, 577, 460.1; 209/584, 900, 220, 221, 222

(56) References Cited

U.S. PATENT DOCUMENTS 4,838,435 * 6/1989 Alexandre et al. .................. 209/555
4,991,719 * 2/1991 Butcher et al. ....................... 209/3.3
5,018,073 * 5/1991 Goldberg ............................ 364/478
5,022,644 * 6/1991 Biirge .................................. 271/270
5,480,032 * 1/1996 Pippin et al. ........................ 209/583
5,655,667 * 8/1997 Isaacs ................................. 209/539

FOREIGN PATENT DOCUMENTS 0167091 1/1986 (EP) .
0227998 7/1987 (EP) .
2217080 9/1974 (FR) .
1410436 * 10/1975 (GB) .

* cited by examiner

*Primary Examiner*—Christopher R. Ellis
*Assistant Examiner*—Khoi H. Tran
(74) *Attorney, Agent, or Firm*—Venable; Norman N. Kunitz

(57) ABSTRACT

The invention concerns a method of controlling the input station in a letter-sorting installation, the input station having a scanning and reading device and a mechanical letter-storage path in which letters are conveyed after being scanned by the scanner, the position x at which the address of each letter is read along the storage path being controlled so that x remains between specified values $x_0$ and $x_{max}$. The invention calls for the number y of uncoded letters along the storage path to be determined in an auxiliary control circuit and the value of y used to generate the control signal u for control of the input station by a control unit.

10 Claims, 6 Drawing Sheets

METHOD OF CONTROLLING THE INPUT STATION IN A LETTER-SORTING INSTALLATION

BACKGROUND OF THE INVENTION

In known installations for sorting letters, an input apparatus supplies the letters to a mechanical storage segment, in which the letters are moved at a predeterminable speed, with a scanner performing an optical scan in the beginning region of the storage segment. While the letter is in the storage segment, the result of the scan is processed further, particularly supplied to a reading apparatus that evaluates the address information provided on the surface of the letter. Before the letters leave the storage segment, the result of the reading apparatus should be available for further distributing the letters or providing them with sorting information corresponding to the reading result. A problem associated with mechanically sorting letters for which information provided on the surface is to be evaluated lies in setting the number of letters supplied per second to the storage segment such that the reading result is actually available before the letters have left the storage segment. In terms of regulating technology, the problem lies in regulating the reading location in the storage segment, that is, the location at which a letter is located in the storage segment when the reading apparatus outputs its result, such that this location remains between predetermined values $x_0$ and $x_{max}$.

It is therefore the object of the present invention to disclose a method and an apparatus suited for executing the method, with which the reading location x of the letters in the storage segment remains between the predetermined $x_0$ and $x_{max}$.

SUMMARY OF THE INVENTION

The invention is characterized by the fact that an auxiliary regulating circuit is used such that the number y of unicoded letters in the storage segment is determined and fed back by way of a regulator for generating the control value u of the input station. In a preferred embodiment of the invention, the reading output z of the reading apparatus is switched to the guide value of the auxiliary regulating circuit by way of a characteristic-curve element.

In a preferred embodiment of the invention, an automatic address reader and/or an apparatus for video coding is or are used as a reading apparatus.

In a further preferred embodiment, a flicker regulator in which the number y of uncoded letters is fed back for generating the control value of the input station is used as a regulator.

In a further preferred embodiment, the characteristic-curve element has a nonlinear characteristic curve.

BRIEF DESCRIPTION OF THE DRAWINGS

The invention is described in detail below in conjunction with drawings. Shown are in FIG. 1 a fundamental representation of an address-reading and video-coding system, FIG. 2 a representation of the structure of the regulating segment, FIG. 3 a representation of the structure of the regulation by means of feedback of an auxiliary regulation value, FIG. 4 the stationary behavior of the plurality of letters in the storage segment and the reading location that have not yet been read, as a function of the processing output of the input station, FIG. 5 a representation of the structure of the entire regulating circuit in an installation having an address reader, FIG. 6 the stationary behavior of the reading location and the plurality of yet-unread letters in the storage segment for special, nonlinear characteristic curves, and FIG. 7 the representation of the structure of the entire regulating circuit in a combined address-reading and video-coding installation.

DESCRIPTION OF THE PREFERRED EMBODIMENTS

Figure 1:
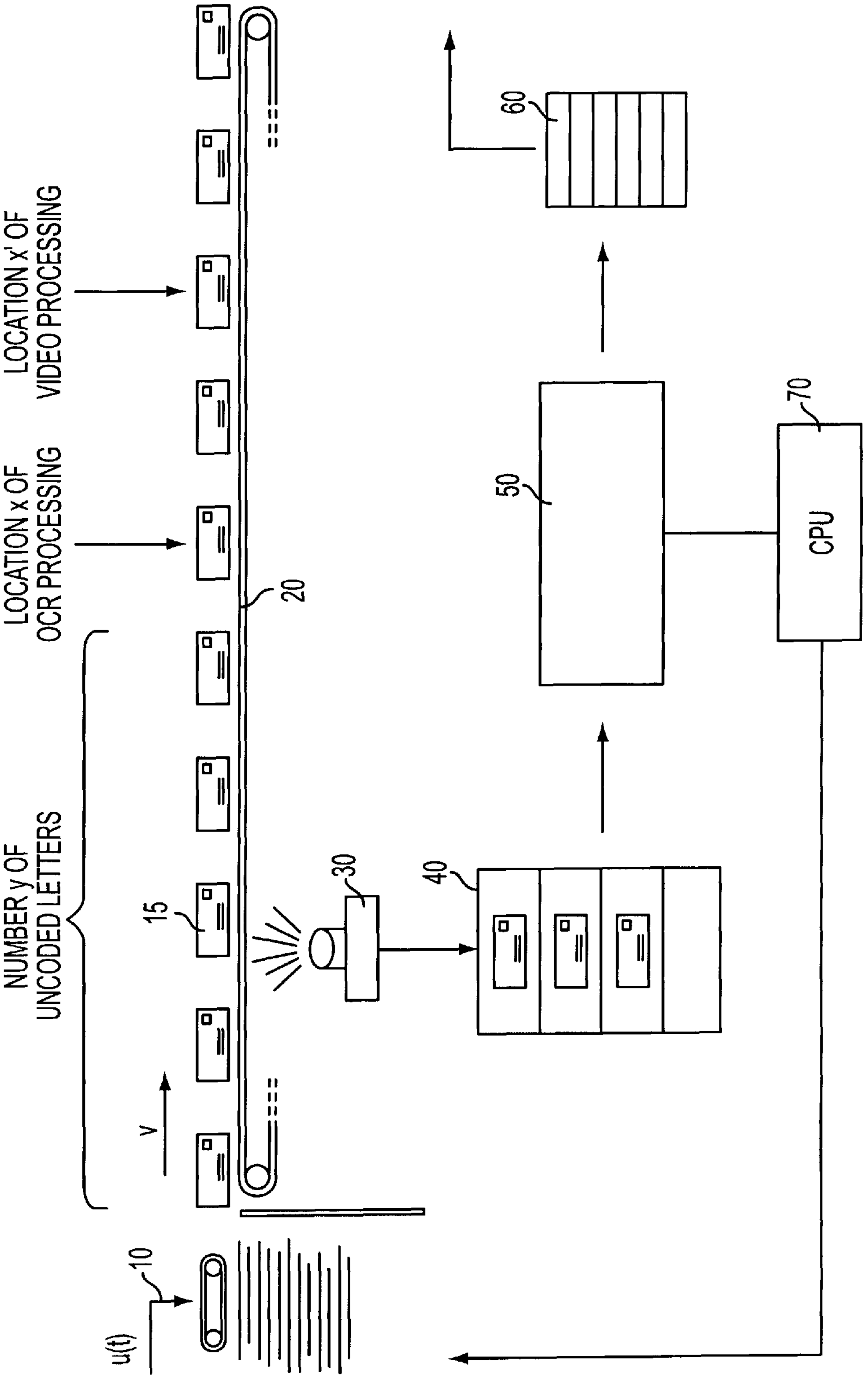

FIG. 1 shows the fundamental representation of a combined address-reading and video-coding installation. In an input station 10 the letters are separated and transferred onto transport belts that convey the letter through the installation and form a mechanical storage segment 20. Shortly beyond the input station 10, the surfaces of the letters are optically scanned by a scanner 30, and their images are supplied to an address-reading apparatus. The point in the storage segment at which a letter is located when the reading apparatus outputs its result is generally characterized as reading location x when an automatic address reader is used. This location is referred to hereinafter as the location of OCR processing (OOCR). With a negative reading result, that is, if the automatic address reading was unsuccessful, video coding can preferably be effected by a coding technician. The point at which a letter is located in the storage segment when a possible video-coding processing has been completed is referred to hereinafter as the location of video processing (OVCR).

The scanning result produced by the scanner 30 is preferably supplied to an image memory 40 and subsequently supplied to an automatic address-reading and/or video-coding device 50. The reading result is supplied to a result memory 60, which supplies sorting or printing information to further apparatuses that are not shown in FIG. 1. A central processor unit 70 effects the control of the entire apparatus.

For successful operation of an apparatus according to FIG. 1, it is crucial to set the output u of the input station 10 and thus the throughput as high as possible, but such that x or OOCR and OVCR is or are located before the end of the storage segment, for all letters if possible.

If the input apparatus is insufficiently controlled, it can occur that, on the one hand, the reading apparatus can be overtaxed if the output u is set too high, so these results are not available until the associated letters have already left the storage segment. These letters cannot be sorted. On the other hand, the reading apparatus can be underutilized if the output of the input station is set too low. The total throughput of the installation is then unnecessarily throttled, with the reading location x being near the input apparatus.

The invention is based on the idea of using auxiliary regulating values instead of the standard practice of feeding back the regulating values, namely x or OOCR or OVCR, and determining from these values a favorable capacity of the input station.

The use of auxiliary regulating values, the optimization of the throughput, and avoidance of storage-segment overloads are discussed first below in conjunction with a simple model of an installation according to FIG. 1.

Figure 2:
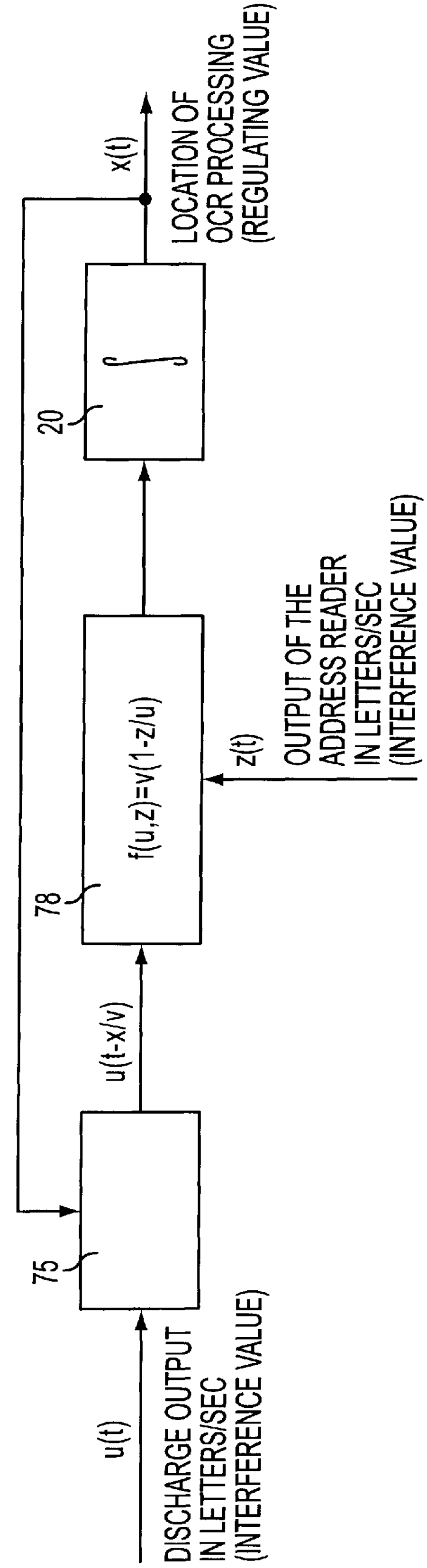

FIG. 2 shows a representation of the structure of an installation according to FIG. 1. It is assumed here that only an address reader is used, which takes the images to be processed, for example in accordance with a FIFO principle, from the image memory, and stores the reading results in the result memory, regardless of whether the reading was successful or unsuccessful. In a continuum approximation, the differential equation $$\dot{x}(t) = v - \frac{z(t)}{d(x,t)}$$

applies for x or OOCR. The speed x(t) at which OOCR moves, is determined, on the one hand, by the transport speed v, which is assumed to be constant; on the other hand, this speed counteracts the processing output z(t) of the address reader, measured in letters/second, which is to be divided by the concentration d(x,t) of letters, given in letters per meter, in the storage segment.

The differential equation $$\frac{\partial(st)}{\partial(s)} = -\frac{1}{v}\frac{\partial d(s,t)}{\partial t}$$

applies for the concentration d(x,t), where s identifies the location coordinates in the transport direction, with the marginal condition $$d(0,t) = \frac{1}{v}\cdot u(t)$$

where u(t) identifies the discharge output of the input stations in letters/second. The general solution to Eq. (2) is known to be $$d(x,t) = \frac{1}{v}u(t - x/v)$$

which can be easily verified by use. Eq. (1) thus Becomes $$\dot{x}(t) = v\cdot v\frac{z(t)}{v(t - x/v)}$$

The result is the representation of the regulating segment structure shown in FIG. 2: x(t) consequently follows a nonlinear differential equation affected by a variable delay time 75, into which the output u(t) of the input station and the processing output z(t) of the address reader are inserted, 78, as influence values. The system is unstable because of the integration member.

The regulating segment according to Eq. 5 is more difficult to control, particularly because of the variable delay time due to stability problems and a slow transient response.

Figure 3:
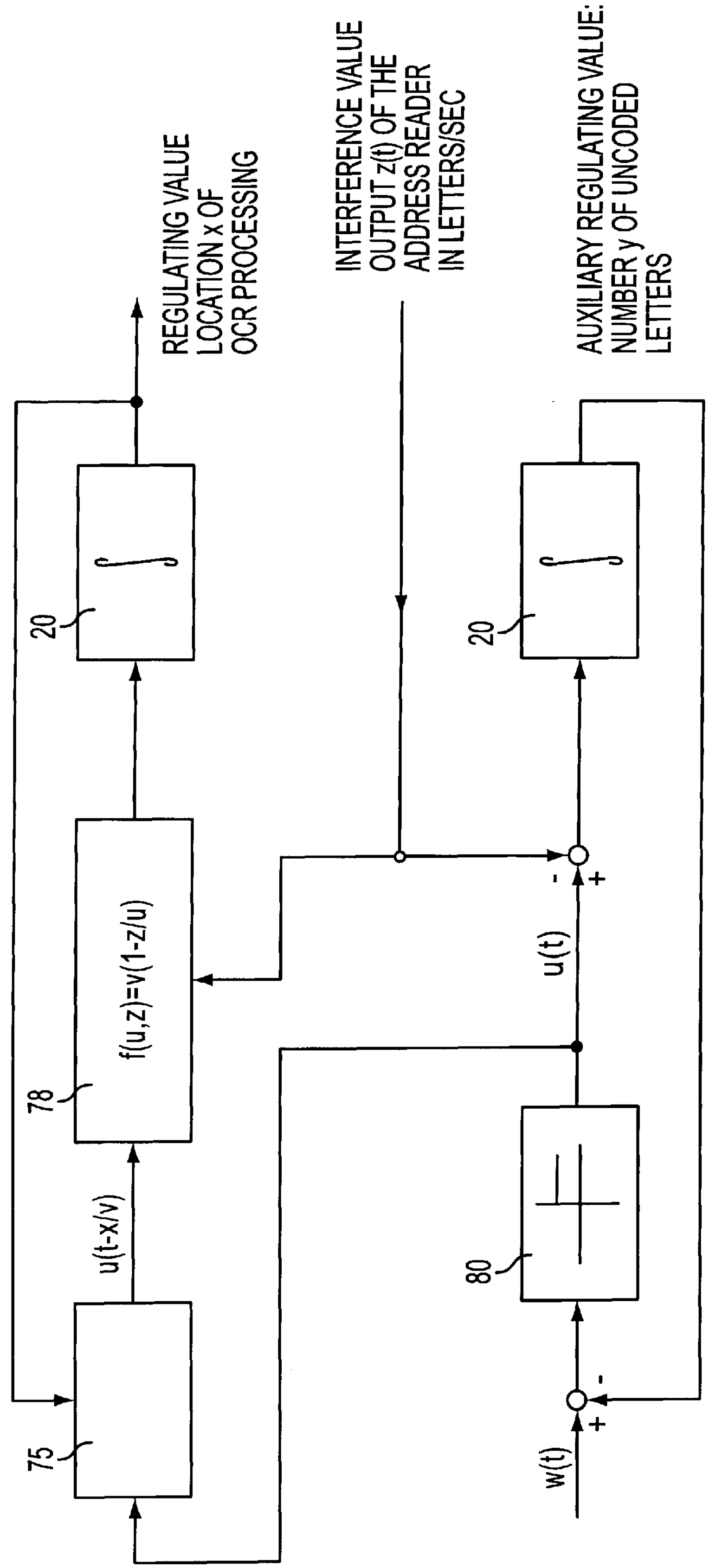

FIG. 3 shows an expansion of the model. In this instance, the number y(t) of letters located in the storage segment without an already-present reading result is considered. Hereinafter y(t) is referred to as the "number of uncoded letters." The simple, linear differential equation $$y(t) = u(t) - z(t) \qquad (6)$$

applies for y, i.e., y results as an integral over the difference of discharge output of the input station and processing output of the address reader. In accordance with the method of the invention, y(t) is determined and fed back to u(t) via a regulator 80, preferably a flicker regulator. The flicker regulator 80 switches the input station 10 to full discharge output $u_{max}$ as long as the measured value y of the storage segment 20 is smaller than the nominal value w, and completely stops the discharge as soon as y has reached the nominal value. The following advantages are attained: the auxiliary regulating circuit for y is time-optimal with the flicker regulator 80, that is, no other regulator exists that can set the auxiliary regulating value y at a predetermined nominal value w in a shorter time. The auxiliary regulating circuit is stable at the same time, and, because of its low order, is not susceptible to oscillations. The auxiliary regulating circuit is stationarily precise, that is, with a time-constant $z(t)=z_{stat}$ and $w(t)=w_{stat}$, $y_{stat}=w_{stat}$ is established insofar as $z_{stat}$ is smaller than the maximum permissible output $o_{max}$ of the input station.

Figure 4A:
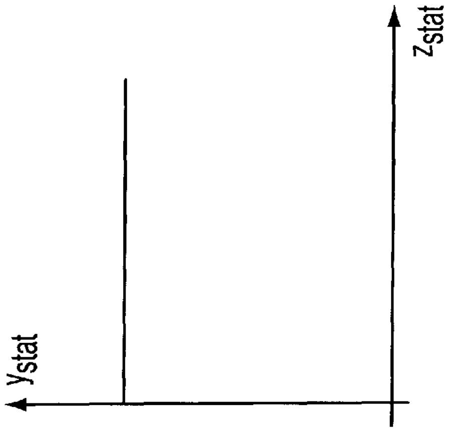
Figure 4B:
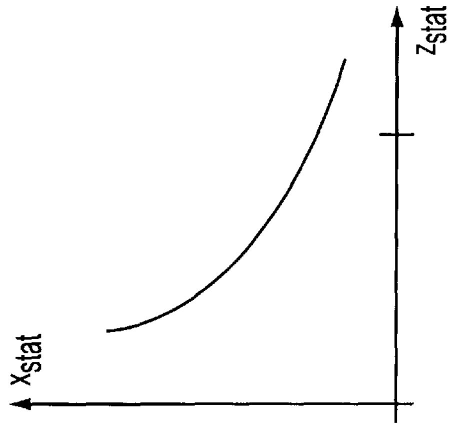

Depending on a nominal value of uncoded letters w(t), that is, depending on the guide value of the auxiliary regulating circuit, the reading locations x are established for different stationary processing outputs z(t). If the nominal value of uncoded letters w is set to be constant, processing outputs z(t) in accordance with FIG. 4 result. In the stationary case, x follows the equation $$x(stat) = w\frac{v}{z_{stat}}$$

as can easily be determined by calculating the spacing between the letters of the storage segment. As can be seen from FIG. 4, such a constant selection of w is unsatisfactory, because at low processing capacities of the address reader, x increases significantly, whereas the storage segment is hardly utilized for high outputs.

Figure 5:
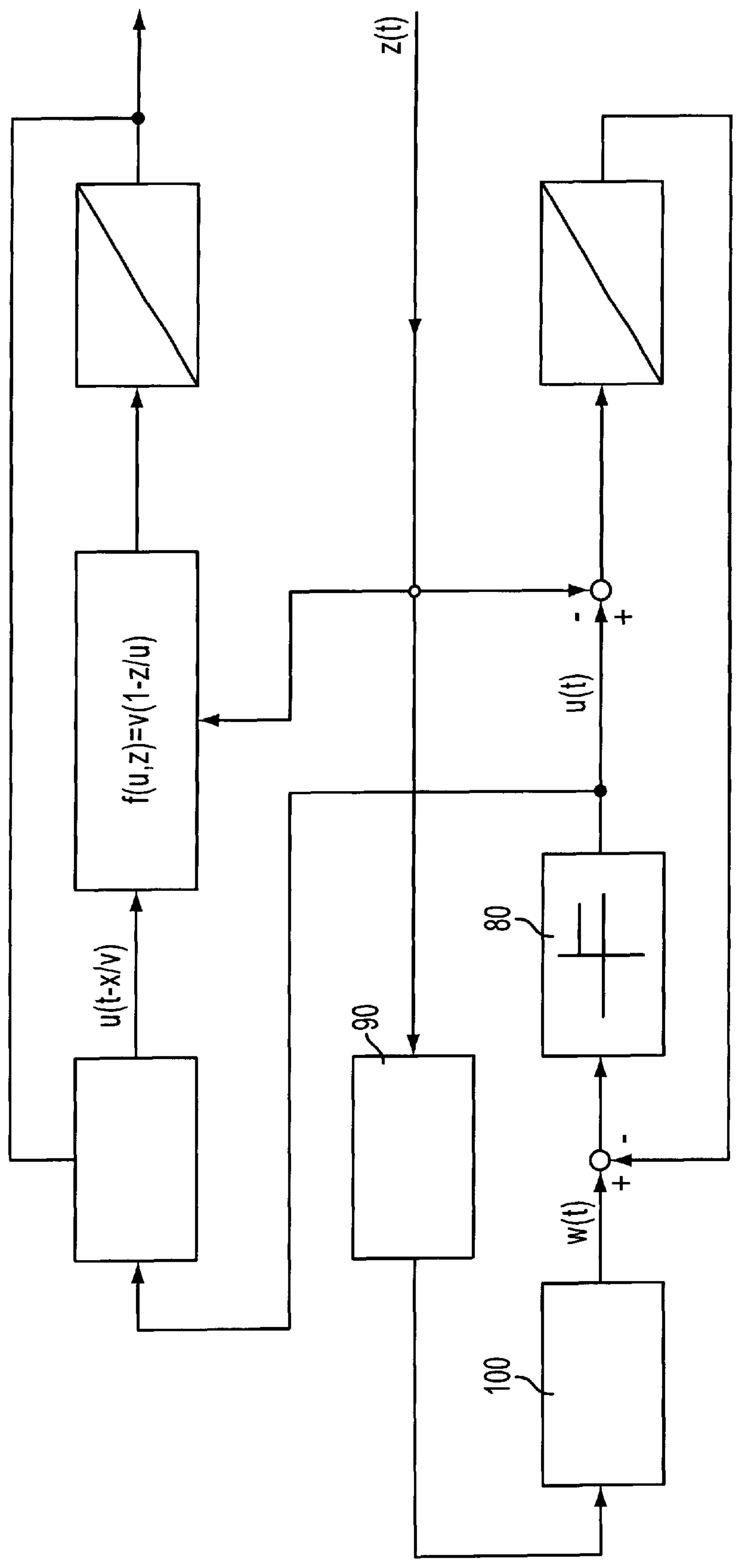
Figure 6A:
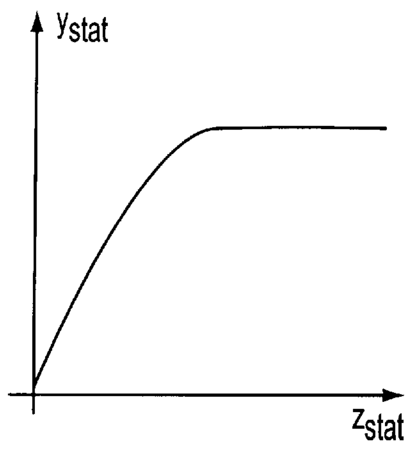
Figure 6B:
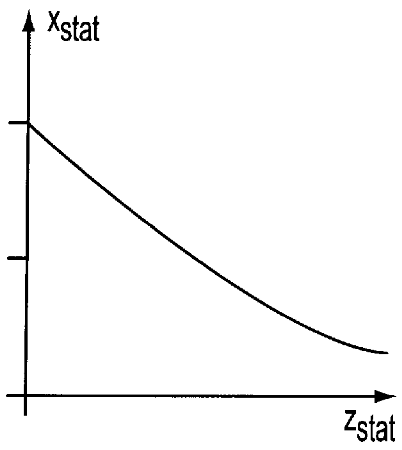

It is more advantageous to select the nominal value w as a function of the currently-available processing output z(t) of the address reader. For this purpose, the instantaneous output z(t) is measured with a measuring element 90 at the output of the address reader; at the same time, a smoothing is effected with a low-pass character, and is switched (interference-value switching) as a nominal value w(t) by way of the nonlinear characteristic curve of a characteristic-curve regulator 100—see FIG. 5. Because reading results only occur at discrete times, the measurement of the processing output is only possible through averaging over a predetermined time, or a predetermined number of reading results is possible. For example, when a coding result occurs, the time since the last occurrence of a result can be determined, and the inverse value of the result can be formed, which is a measure for the coding output. In the consideration of a plurality of coding results, an averaging, that is, a low-pass effect, is a factor of the measurement. The value y is determined through response synchronization of electrical components, with the aid of counters. For example, the input apparatus emits a message regarding the number letters that have been discharged, while the reading electronics announces each reading result. Thus, the number of uncoded letters can be determined through enumeration. As in FIG. 3, feedback to the control value u(t) is effected by way of a flicker regulator 80. With a suitable selection of the nonlinear characteristic curve 100, a favorable course is established for x as a function of the stationary processing output. FIG. 6*a* qualitatively shows a preferred, nonlinear characteristic curve, and FIG. 6*b* qualitatively shows the associated course of x according to Eq. (7). As a result, for low processing outputs z, the entire length of the storage segment is utilized; for an average processing output, x lies approximately in a region of the center of the storage segment; and for a high output z, x moves into the vicinity of the input station for high output z. The total throughput of a system regulated in this manner closely approaches the ideally-attainable throughput with a simultaneously low number of storage segment overloads, that is, the number of letters for which no reading result from the address reader was present when they left the storage segment.

Figure 6C:
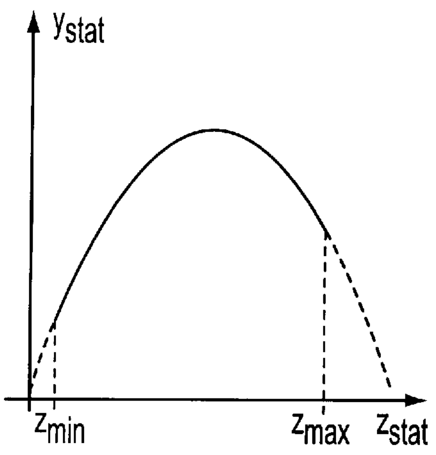
Figure 6D:
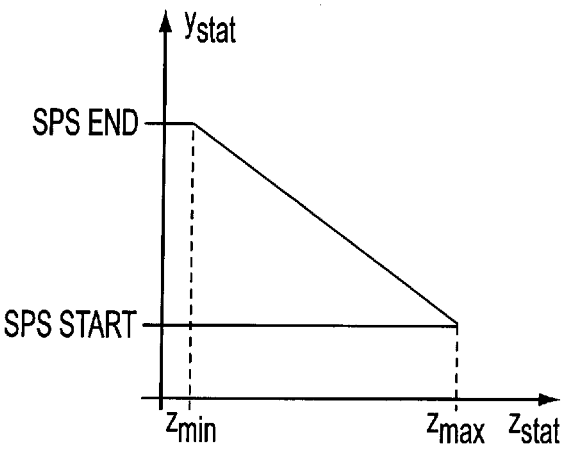

A further advantageous characteristic curve is shown qualitatively in FIGS. 6c and d. If it is known that the output of the address reader is constantly between $z_{min}$ and $z_{max}$, a characteristic curve can be weighted that utilizes the entire length of the storage segment, from beginning to end.

Instead of the characteristic curves discussed above, other forms are also considered. These forms can be advantageous if further marginal conditions, such as a limited number of image memories, result memories or others, are to be considered. Eq. (7) always indicates the connection between the stationary behavior of x and y due to $y_{stat}=w_{stat}$, so, with a given course $x_{stat\ (zstat)}$, the characteristic curve $w(z_{stat})$ that generates it can be calculated.

The above-described method can be adapted for an installation without an address reader, but which includes video coding, in which case the output z of the address reader is to be replaced by the labor of the coding technician. Further parameters, such as the length of the storage segment and characteristic points of the nonlinear characteristic curve—FIG. 6—are to be adapted to the typically longer time for determining the address.

The method of the invention can likewise be used in an installation that includes a combination of address reader and video coding, in which only the letters for which the address produces a negative result are video-coded. Aspects of both the address reader and the video-coding apparatus must be considered in establishing the discharge output. This process is preferably effected as follows:

1. A suitably-long front piece $I_{OCR}$ is associated with the address reader in the storage segment. The input station is controlled as described above, with an appropriate selection of the nonlinear characteristic curve ensuring that OOCR remains within the associated storage-segment piece $I_{OCR}$. The regulating algorithm then generates a nominal value $w_{OCR}$ of uncoded letters, and a discharge output $u_{OCR}$.

2. The regulation for the video-coding region is designed such that the location of video coding OVCR remains within the entire storage segment. It must be taken into consideration here that the number $y_{video}$ of uncoded letters cannot be determined precisely, because not every letter located in the storage segment must be video-coded, and the success or failure of the address reader is not known in advance. However, $y_{Video}$ can be predicted as the sum of the number of letters already processed by the address reader that have a negative result and the number of letters for which no address-reader result is present yet, but for which a negative result is expected. Put into a formula, $$y_{Video}=n_{OCRnegative}+y_{OCR}\cdot(1-\bar{l}) \quad (8)$$

Here $n_{OCR\ negative}$ represents the number of letters for which a negative address-reader result is already present, but as of yet no video-coding result is present, and $y_{OCR}$ represents the number of letters for which no address-reader result is present yet.

The prognosis value $\bar{l}$ of the reading rate for the letters $y_{OCR}$ that have not yet been OCR-processed is determined as an average value from a certain number of letters already processed by the address reader, namely as the quotient of successfully-processed letters $n_{OCR\ positive}$ and the total number of processed letters $n_{total}$, which quotient is updated at times to be predetermined:

$$\bar{l}=\frac{n_{OCRpositive}}{n_{total}}$$

Taking into consideration this peculiarities, the regulation generates a value $w_{video}$ for the video-coding region and a discharge output $u_{Video}$.

Figure 7:
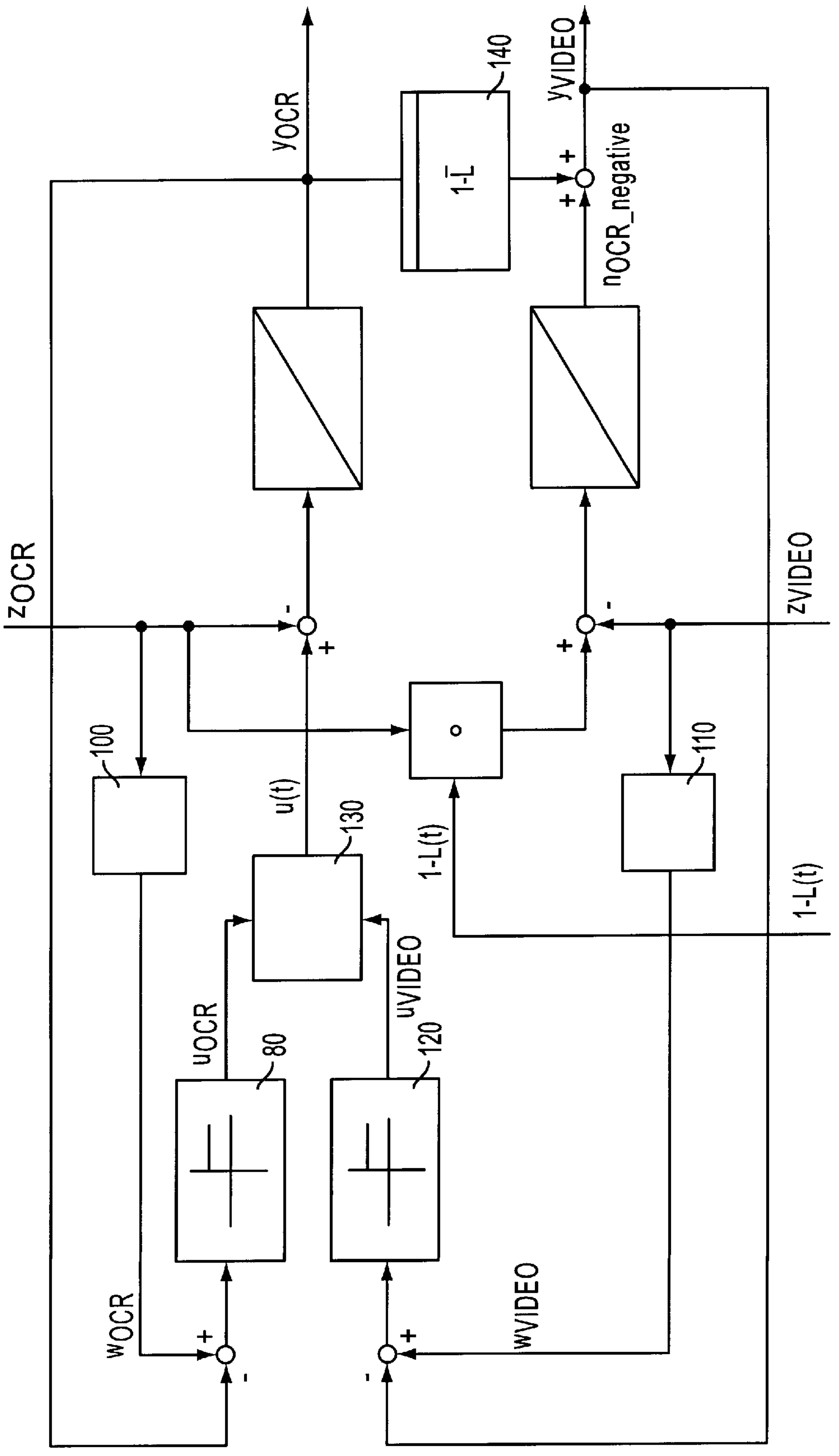

The discharge outputs $u_{OCR}$ and $u_{Video}$ result from the regulations for the address reader and the video coding. Because a discharge output can only be realized by the input station, a discharge output u must be determined from the two values $u_{OCR}$ and $u_{Video}$. A preferred value is $u=\min(u_{OCR}, u_{Video})$ FIG. 7 shows an embodiment of a complete regulating circuit for a combination of address reader and video coding. In this instance, the parts of the regulating circuit for $y_{OCR}$ that have been taken in their entirety from FIG. 5 are shown in bold print. The characteristic-curve regulator 100 or 110 in the graphic representation of FIG. 7 is to be interpreted such that it also includes measuring elements having a low-pass effect. In the auxiliary regulating circuit for $y_{Video}$, $y_{video}$ is fed back and the instantaneous output $z_{Vidoe}$ is switched as a nominal value $w_{video}$ by way of a characteristic-curve regulator 110. The feedback to u is effected by way of a regulator 120. The circuit 130 determines the minimum of $u_{OCR}$ and $u_{Vidoe}=u(t)$. The determined value $y_{OCR}$ is used in the circuit 140 to form a prognosis $\bar{1}$–L, from which $y_{Video}$ is again determined with the use of $n_{OCR\ negative}$.

L(t) represents the actual reading rate. This is the cause for an increase in $n_{OCR\ negative}$, and cannot be measured precisely. This is, however, not necessary, because $n_{OCR\_negative}$ can be determined directly by counters, as can $y_{OR}$. $\bar{L}$ is the prognosis value of L, which is determined from past values in accordance with Eq. (9), and is assumed to be valid for the letters $y_{OCR}$ that have not yet been OCR-processed.

The selection of $u=\min(u_{OCR}, u_{Video})$ is particularly practical if unprocessed letters at the end of the storage segment must absolutely be avoided. If, on the other hand, a specific number of unprocessed letters can be tolerated, while a high throughput is the primary objective, it is practical, for example, to use $u=u_{OCR}+u_{Video}/2$. In such a case, the circuit 130 is to be modified correspondingly.

What is claimed is:

1. Method of controlling the input station (10) for a mail-sorting installation, having a scanning and reading apparatus (30, 50) for reading and evaluating addresses on letters and a mechanical storage segment (20), within which the letters are moved following processing in the scanning apparatus, wherein a control of the reading location x of each letter is effected in the storage segment, so that x remains between predetermined values $x_0$ and $x_{max}$, said reading location x being the position of a letter on said storage segment when the address on such letter is evaluated, comprising determining the number y of uncoded letters in the storage segment (20) in an auxiliary regulating circuit, and feeding y back by way of a regulator (80) to generate a control value u for the discharge rate of the input station (10).

2. Method according to claim 1, wherein a guide value of said auxiliary regulating circuit is derived from the output rate z of processing letters by said reading apparatus by means of a characteristic-curve element (100).

3. Method according to claim 1 wherein an automatic address reader or a video-coding apparatus is provided as said reading apparatus.

4. Method according to claim 1 wherein the regulator (80) is configured as a flicker regulator.

5. Method according to claim 1 wherein the characteristic-curve element (100) has a nonlinear characteristic curve.

6. Method according to claim 1 wherein an automatic address reader and a video-coding apparatus are provided as said reading apparatus an auxiliary regulating circuit is associated with the automatic address reader to generate a control value $u_{OCR}$, and a secondary auxiliary regulating circuit is associated with the video-coding apparatus to generate a control value $u_{Video}$, said control value u being determined from said control values $u_{OCR}$ and $u_{Video}$.

7. Method according to claim 6, characterized in that u is determined by selecting the minimum of $u_{OCR}$ and $u_{Video}$.

8. Mail sorting apparatus comprising an input apparatus for inputting mail comprising letters, a mechanical storage segment for conveying letters inputted by said input apparatus, a scanning apparatus arranged to scan the addresses on letters conveyed by said storage segment, a reading apparatus for evaluating the information in the addresses scanned by said scanning apparatus, means for determining the number y of the letters on said storage segment which have not been evaluated by said reading apparatus, a regulator, and an auxiliary regulating circuit for feeding back y by way of said regulator to generate the control value u for the input rate of said input station.

9. Apparatus according to claim 8 wherein a guide value of the auxiliary regulating circuit is derived from the output z of said reading apparatus by means of a characteristic-curve element (100).

10. Apparatus according to claim 8 characterized in that an automatic address reader or a video-coding apparatus is provided as said reading apparatus (50).

* * * * *